US005811670A

United States Patent [19]

Nolte et al.

[11] Patent Number: 5,811,670

[45] Date of Patent: Sep. 22, 1998

[54] PROCESS AND DEVICE FOR EVALUATING THE QUALITY OF A FUEL-AIR MIXTURE

[75] Inventors: Hubert Nolte; Martin Herrs, both of Höxter, Germany

[73] Assignee: Stiebel Eltron GmbH & CO. KG, Holzminden, Germany

[21] Appl. No.: 835,074

[22] Filed: Apr. 4, 1997

[30] Foreign Application Priority Data

Apr. 12, 1996 [DE] Germany ........................ 196 14 388.8

[51] Int. Cl.[6] .................................................... G01M 15/00

[52] U.S. Cl. ............................ 73/116; 324/378; 324/399; 324/402

[58] Field of Search .................................... 73/116, 117.2, 73/117.3, 118.1, 118.2; 324/399, 402, 378, 382, 71.1; 701/103, 109

[56] References Cited

U.S. PATENT DOCUMENTS

| | | | |
|---|---|---|---|
| 3,789,816 | 2/1974 | Taplin et al. | 73/116 |
| 4,104,990 | 8/1978 | Frobenius | 73/116 |
| 4,601,193 | 7/1986 | Blauhut et al. | 73/116 |
| 4,779,455 | 10/1988 | Kuroiwa et al. | 73/116 |
| 5,237,278 | 8/1993 | Bumen | 324/402 |
| 5,272,914 | 12/1993 | Murata et al. | 73/116 |
| 5,293,129 | 3/1994 | Ikeuchi et al. | 324/402 |
| 5,387,870 | 2/1995 | Knapp et al. | 324/378 |
| 5,452,603 | 9/1995 | Asano et al. | 73/116 |
| 5,636,620 | 6/1997 | Kiess et al. | 73/116 |
| 5,652,520 | 7/1997 | Kawamoto et al. | 73/116 |

FOREIGN PATENT DOCUMENTS

| | | |
|---|---|---|
| 0 394 234 B1 | 8/1993 | European Pat. Off. . |
| 28 02 196 C2 | 10/1985 | Germany . |
| 30 06 665 C2 | 6/1988 | Germany . |
| 34 45 539 C2 | 5/1989 | Germany . |
| 24 49 836 C2 | 6/1989 | Germany . |
| 42 39 803 C2 | 9/1995 | Germany . |
| 195 17 390 A1 | 11/1995 | Germany . |

OTHER PUBLICATIONS

Kazuo Iinuma Apr. 1990 Studies of Engine Combustion.
Wenzlawski et al. Mar. 1990 Ionenstrommessun g am Zündkerzen . . . Motortechnische Zeitschrift, vol. 51, No. 3.

*Primary Examiner*—George M. Dombroske
*Attorney, Agent, or Firm*—McGlew and Tuttle

[57] ABSTRACT

The quality of a fuel-air mixture shall be evaluated by a process and a device during a phase of combustion, especially in a spark ignition engine, in order to make possible a low-emission, fuel-saving and knock-free operation. An electrical testing pulse P is sent for this purpose to the spark plug during the phase of combustion V following the ignition pulse Z. The effect of the actual fuel-air mixture of the combustion chamber on the testing pulse is detected and evaluated as an electrical variable.

22 Claims, 4 Drawing Sheets

PROCESS AND DEVICE FOR EVALUATING THE QUALITY OF A FUEL-AIR MIXTURE

FIELD OF THE INVENTION

The present invention pertains to a process for evaluating the quality of a fuel-air mixture during a phase of combustion, especially in a spark-ignition engine, in which an electrical ignition pulse initiating the phase of combustion is cyclically applied to a spark plug of a combustion chamber. The present invention also pertains to a device for carrying out such a process.

BACKGROUND OF THE INVENTION

According to the state of the art, spark ignition engines are operated with a (rich) fuel-air mixture, whose lambda value (fuel-to-air ratio) is about 1. Such a mode of operation is not always satisfactory in terms of the combustion gases and the fuel consumption.

Spark ignition engines which are operated with a lean fuel-air mixture (lambda value>1) have been known as well. The fuel consumption is reduced as a result. However, pre-ignition and detonation, also known as "knocking", may occur, which is undesirable.

What is evaluated in the prior-art engines is not the fuel-air mixture of individual phases of combustion, so that the regulation of the fuel-air mixture is correspondingly flat.

An ionic current probe for detecting the state of ionization of reaction mixtures is described in DE 28 02 196 C2. The ionic current probe is connected to an evaluating unit for the ionic current to form an actuating or display variable. To burn off residues, an ignition voltage is applied to the ionic current probe, which may be formed by a spark plug.

An ionic current detection means for an internal combustion engine is proposed in DE 42 39 803 C2. The combustion of the gas mixture is to be confirmed with this by determining a combustion pulse. The only thing that can be determined is whether combustion took place or not.

An evaluation of the lambda value, in which the time between the ignition pulse and the propagation of the flame front is determined, has been known from DE-PS 34 45 539. This time represents the actual lambda value. An electrode mounted separately in the combustion chamber is used to measure the propagation of the flame front.

SUMMARY AND OBJECTS OF THE INVENTION

The object of the present invention is a process and a device for evaluating a fuel-air mixture in order to make possible a fuel-saving and knock-free operation of an internal combustion engine, especially a spark ignition engine, with low pollutant emissions.

The above object is accomplished according to the present invention with a process of the type described in the introduction by applying an electrical testing pulse to the spark plug during the phase of combustion following the ignition pulse and by determining the effect of the actual fuel-air mixture in the combustion chamber on the testing pulse as an electrical variable.

It is achieved as a result that the mixing ratio (lambda value) of the fuel-air mixture actually present in the combustion chamber is determined during an individual phase of the combustion by the use of the spark plug already present anyway. The spark plug acts as an ionization electrode in the combustion chamber, and the ionization of the fuel-air mixture actually present in the combustion chamber, which ionization depends on the mixing ratio, correspondingly affects the electrical testing pulse. The active presetting of a defined testing pulse leads to more readily reproducible and more readily evaluatable signals than does an only passive evaluation of the ionization of the combustion gases.

The electrical variable derived from the effect on the testing pulse can be used to control the mixing ratio of the next phase of combustion and/or of the next phases of combustion. This can be done by correspondingly increasing and/or reducing the fuel supply and/or the air supply in order to reach the set point of the mixing ratio. The ignition point is preferably also adjusted in the range of the mixing ratios in which the engine tends to "knock" in order to avoid "knocking" during the subsequent combustion processes.

In the borderline case, the optimal mixing ratio and the optimal ignition point can be set for the next phase of combustion after each phase of combustion (working cycle of the spark ignition engine) or after each testing pulse. However, it may also be advantageous to form a mean value from a plurality of testing pulses of consecutive phases of combustion and to perform the adjustment for one or more subsequent phases of combustion with this mean value and/or to perform the adjustment for a plurality of subsequent phases of combustion on the basis of the testing pulse of one phase of combustion.

A spark ignition engine usually has a plurality of combustion chambers (cylinders). It is possible due to the present invention to determine and set the mixing ratio and, if needed, the ignition point separately for each cylinder.

A device for carrying out this process in a spark ignition engine has a contact breaker triggering the ignition pulse and an ignition coil generating the ignition pulse. A testing pulse generator detects the time of ignition at the contact breaker and generates the testing pulse with a time delay. The testing pulse generator is connected to the spark plug and an evaluating circuit, which evaluates how the testing signal is affected by the actual fuel-air mixture in the combustion chamber. The testing pulse generator is connected to the spark plug and to the evaluating circuit via a precision resistor. Another one or two voltage-dependent resistors are connected in series with a secondary winding of the ignition coil and the voltage dependent resistors uncouple the testing pulse P from the secondary winding of the ignition coil. This electrical device can be integrated in a usual ignition system in a simple manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
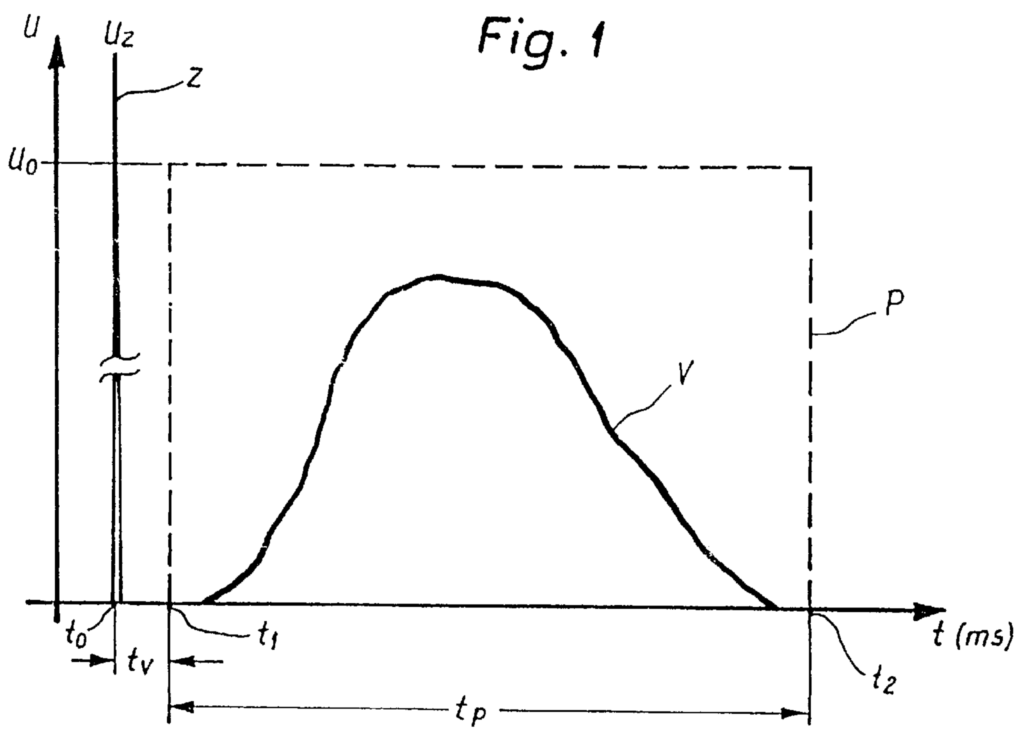
FIG. 1 shows a time diagram of a phase of combustion (working cycle of a spark ignition engine) with ignition pulse and testing pulse.
Figure 5:
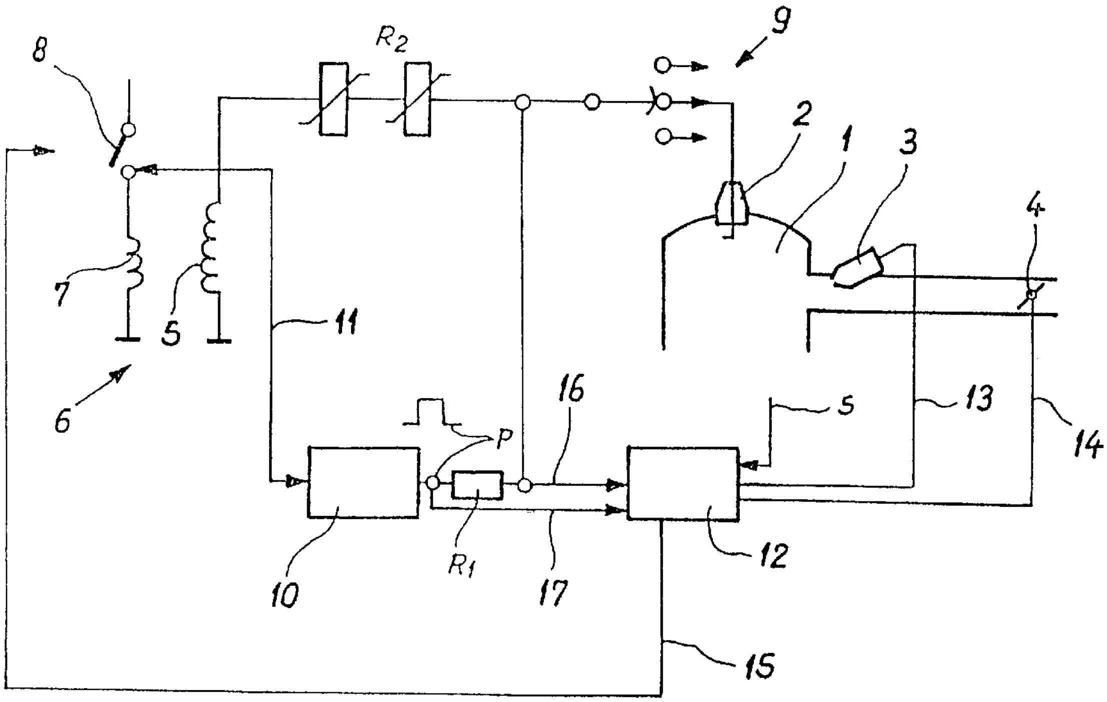
FIG. 5 schematically shows a circuit diagram for generating and evaluating the testing pulse according to FIGS. 1 through 4.

A spark ignition engine has a plurality of combustion chambers 1, one of which is shown in FIG. 5. A spark plug 2 is arranged in the combustion chamber 1. A fuel-air mixture, whose mixing ratio can be set by means of, e.g., an injection nozzle 3 and a throttle valve 4, can be fed into the combustion chamber 1 via a valve, not shown.

The spark plug 2 is connected to a secondary winding 5 of an ignition coil 6, and a contact breaker 8 is located before the primary winding 7 of the ignition coil. An ignition distributor 9 distributes the ignition pulses to the spark plugs 2 of the combustion chambers.

The phase of combustion V of a combustion chamber 1 of a four-stroke spark ignition engine is indicated in FIGS. 1 through 4. The phase of combustion begins with an ignition pulse Z, which is generated by the spark plug 2 via the contact breaker 8 and the ignition coil 6 and has an ignition voltage of, e.g., 15 kV. It ends, depending on the speed of the engine, after a few msec, after which the exhaust gas is expelled from the combustion chamber 1. In the exemplary embodiments according to FIGS. 1 through 4, a testing pulse P, indicated by a broken line, is generated by a testing pulse generator 10 during each phase of combustion V with a time delay of tv after each ignition point t0. To detect the ignition point, the testing pulse generator 10 is coupled with the contact breaker 8 or the secondary winding 5 of the ignition coil 6 via a control line 11. The testing pulse P is a square pulse, which includes the phase of combustion V. The testing pulse begins at time t1, after the time delay tv. The time delay tv is selected to be such that the testing pulse begins before the beginning of the phase of combustion V proper. The time delay Tv is shorter than 1 msec; it is, e.g., 0.1 msec. Post-pulse oscillations of the ignition voltage are filtered out due to the time delay tv. The testing pulse P ends at the time t2 after the phase of combustion V. Its duration tp is about 15 msec, maximum.

The amplitude U0 remains constant during the duration of the testing pulse before the resistor R1 and it is reduced by a possible ionization behind the resistor R1. The amplitude of the testing pulse P is substantially smaller than the ignition voltage Uz of the spark plug. The maximum U0 of the amplitude is, e.g., between about 100 V and 1,000 V and preferably 600 V.

The testing pulse P is applied to the spark plug 2 via a precision resistor R1. An evaluating circuit 12 connected to the precision resistor R1 detects the change in the amplitude or in the shape of the measured signal Pio, which occurs as a function of the actual mixing ratio in the combustion chamber 1 as a consequence of the difference in the ionization of the fuel-air mixture, compared with the testing pulse P with the maximum U0. Measuring lines 16, 17 before and behind the precision resistor R1, which are connected to the evaluating circuit 12 and send a differential signal to this circuit, are used for this purpose. FIGS. 2, 3 and 4 show such changes in amplitude and the changes in the measured signal on the basis of measured results.

Figure 2A:
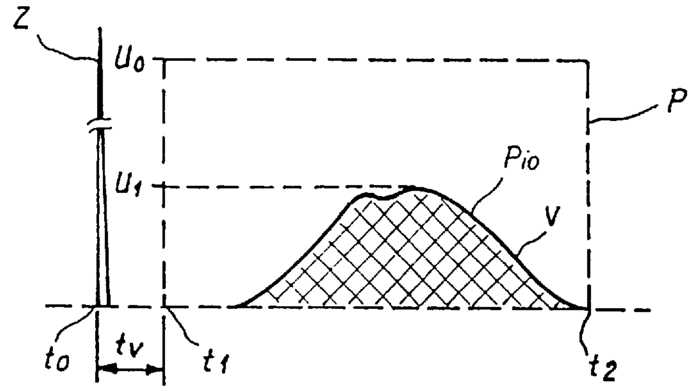
FIGS. 2 A,B,C show measurement diagrams of the testing pulse in the case of a rich mixture, e.g., lambda 0.8.
Figure 3A:
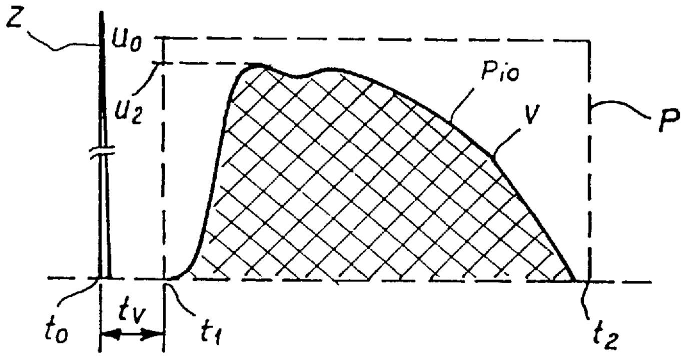
FIGS. 3 A,B,C show measurement diagrams of the testing pulse at a lambda value of about 1.
Figure 4A:
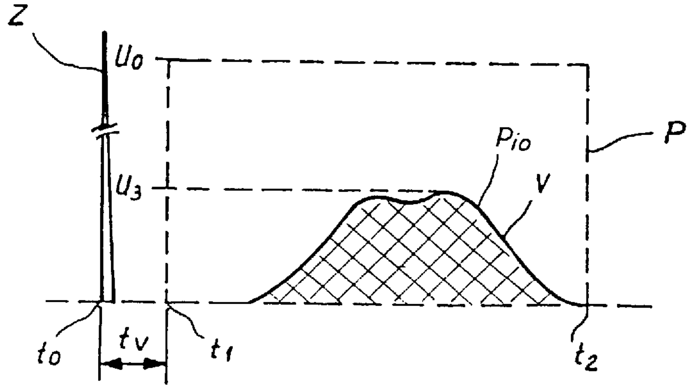
FIGS. 4 A,B,C show measurement diagrams of the testing pulse in the case of a very lean mixture, e.g., lambda>1; wherein the measurement diagrams 2A, 3A and 4A represent an integral measurement, the measurement diagrams 2B, 3B, 4B represent voltage measurement in a predetermined time window, and the measurement diagrams 2C, 3C, 4C represent a time measurement dependent on the reaching of a voltage threshold value.
Figure 2B:
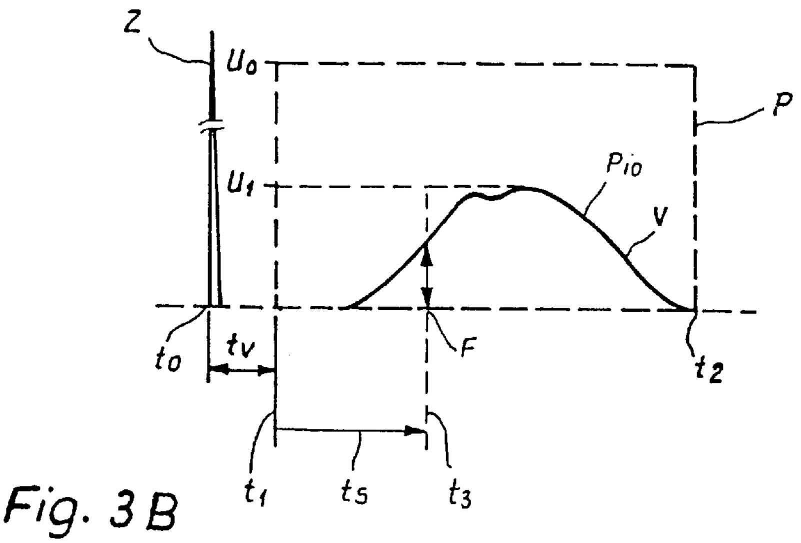
Figure 2C:
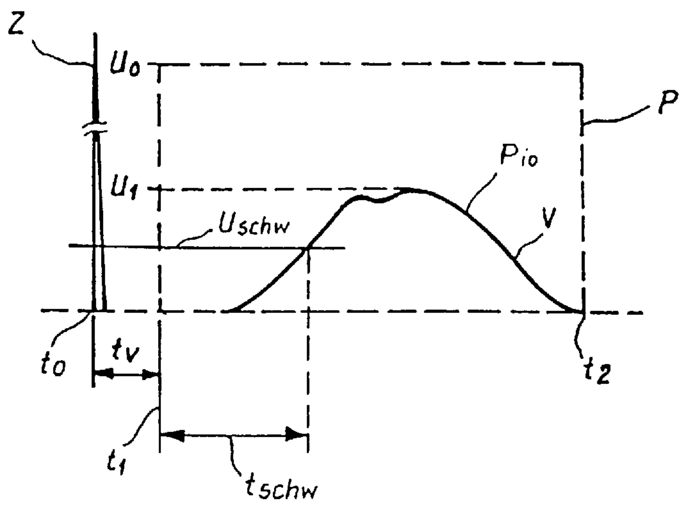

At a mixing ratio corresponding to lambda<1, the measured signal pulse Pio with an amplitude U1 is obtained during the measurement, see FIGS. 2A, 2B, 2C. At a mixing ratio corresponding to a lambda value of about 1, a measured signal pulse Pio with an amplitude U2 is obtained during the measurement, see FIGS. 3A, 3B, 3C. At a mixing ratio corresponding to lambda>1, a measured signal pulse Pio with an amplitude U3 is obtained during the measurement, see FIGS. 4A, 4B, 4C. The actual change in the measured signal pulse Pio obtained compared with the testing pulse is thus an indicator of the actual mixing ratio in the combustion chamber 1 during the phase of combustion V. This change is detected by the evaluating circuit 12, which evaluates it for controlling the injection nozzle 3 via a control line 13 and/or for controlling the throttle valve 4 via a control line 14 and for controlling the ignition point of the contact breaker 8 via a control line 15.

A set point S, which presets the actually desired mixing ratio, is applied to the evaluating circuit 12. Corresponding to the deviation from the set point S, the evaluating circuit 12 adjusts the fuel and/or air supply via the control lines 13, 14.

In the circuit according to FIG. 5, the testing pulse P is sent to the spark plug 2 via the precision resistor R1. The secondary winding 5 is uncoupled from the testing pulse P by one or more voltage-dependent resistors R2. As a result, this testing pulse acts at the spark plug 2, but not at the secondary winding 5. The voltage-dependent resistors R2 are connected in series to the secondary winding 5. They represent a low resistance for the ignition voltage Uz and a high resistance for the testing pulse P. A simple circuit is obtained as a result, which guarantees that the ignition pulse Z can act on the spark plug 2 undisturbed, and that the testing pulse P reaches the spark plug 2 undisturbed.

Since the ignition distributor 9 is located between the voltage-dependent resistors R2 and the spark plug 2, the described circuit detects the phase of combustion V individually in each combustion chamber 1.

The evaluation of the measured signal pulses Pio can be performed in a plurality of different manners or embodiments by a corresponding design of the evaluating circuit 12:

Embodiment A: The evaluating circuit 12 integrates the shape of the measured signal pulse Pio, which is obtained as a consequence of the effect of ionization during the actual combustion process V on the testing pulse P, over time, namely, over the duration of the testing pulse P, see FIGS. 2A, 3A, 4A. As is shown by the comparison of the shaded areas which are integrals of the measured signal curves in FIGS. 2A, 3A, 4A. This area is markedly larger at a lambda value of about 1, see FIG. 3A, than at lambda<1 and lambda>1, see FIGS. 2A and 4A, which can be evaluated by the evaluating circuit 12 in a simple manner and can be used to control the fuel-air mixture.

Figure 3B:
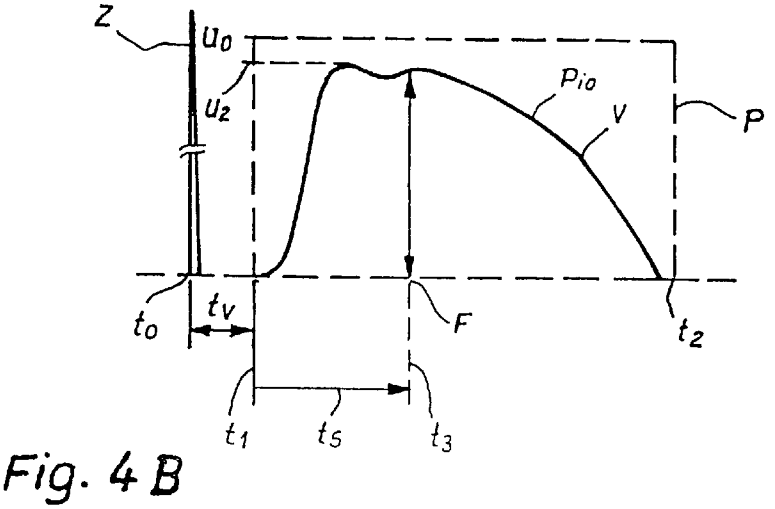
Figure 4B:
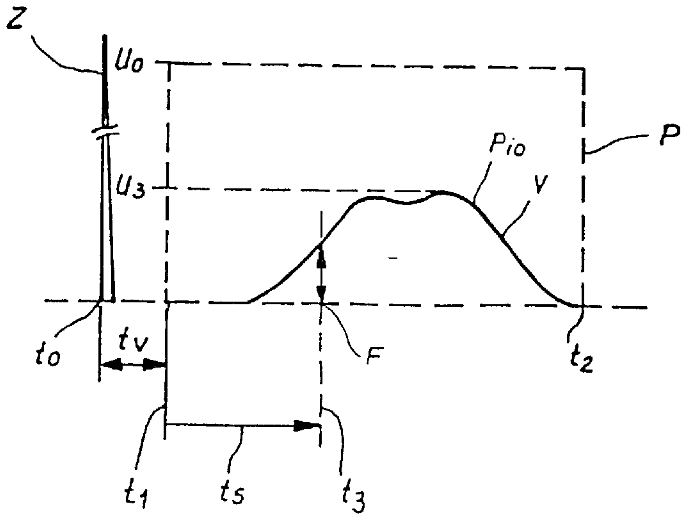

Embodiment B: A timer is started with the beginning of the testing pulse P at the time t1 or with the ignition pulse Z. After the time ts, preset by this timer and longer than the time delay tv, a measurement window F is opened at the time t3 for a time that is very short compared with the duration of the combustion process V. During this measurement window F, the evaluating circuit 12 detects the actual value of the measured value signal Pio, see FIGS. 2B, 3B, 4B. The comparison of the value of the measured signals Pio in the measurement windows F in FIGS. 2B, 3B, 4B shows that the measured signal is markedly higher at the measurement time t3 at a lambda value of about 1, see FIG. 3B, than at a lambda value<1 and at a lambda value>1, see FIGS. 2B, 4B. This can be evaluated by the evaluating circuit 12 in a simple manner and can be used to control the fuel-air mixture.

It is not necessary in this embodiment for the duration of the testing pulse P to completely include the combustion process V. The beginning t1 and the end t2 of the testing pulse P may be placed close to the measurement window F.

Embodiment C: A threshold value $U_{schw}$, which is lower than the amplitudes U1, U2, U3, is preset by the evaluating circuit 12. The evaluating circuit 12 detects the duration $t_{schw}$ after which the measured signal Pio reaches the threshold value $U_{schw}$. The beginning of the duration $t_{schw}$ can be placed at the time t1 of the beginning of the testing pulse P, see FIGS. 2C, 3C, 4C or at the ignition point t0.

Figure 3C:
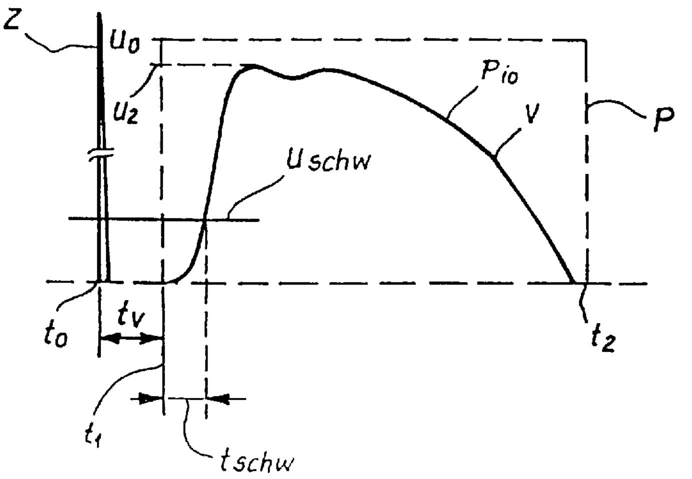
Figure 4C:
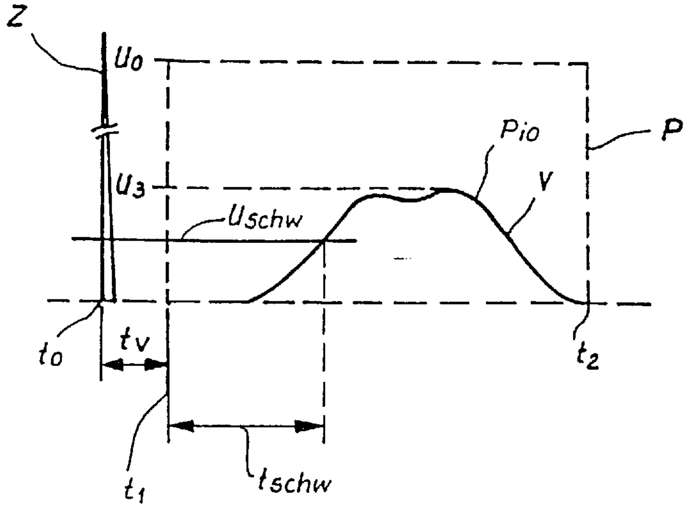

As is shown by the comparison of FIGS. 2C, 3C, 4C, the duration $t_{schw}$ until the threshold value $U_{schw}$ is reached is markedly shorter at a lambda value of about 1, see FIG. 3C than at lambda<1 and lambda>1, see FIGS. 2C, 4C, which can be evaluated by the evaluating circuit 12 in a simple manner and can be used to control the fuel-air mixture.

Embodiment D: A combination of the processes according to embodiments C and A is also possible. The integration according to A is now started when the threshold value $U_{schw}$ is reached. The effect of interfering variations of the measured signal, which are below the threshold value $U_{schw}$ and within the duration $t_{schw}$, on the result of the integration is suppressed as a result.

Whether the actual combustion process is superstoichiometric or substoichiometric lambda>1 or lambda<1 is not detected in the processes A, B, C, D. However, this can be detected by the evaluating circuit 12 detecting the actual position or the actual direction of adjustment of the actuator nozzle 3, throttle valve 4, because the actual positions or directions of adjustment are a reflection of the mode of operation in the superstoichiometric or substoichiometric range.

While specific embodiments of the invention have been shown and described in detail to illustrate the application of the principles of the invention, it will be understood that the invention may be embodied otherwise without departing from such principles.

What is claimed is:

1. A process for evaluating a air-fuel ratio of a air-fuel mixture during combustion, the process comprising the steps of;

providing a combustion chamber for holding the air-fuel mixture, said combustion chamber including a spark plug;

igniting the air-fuel mixture with an electric ignition pulse to said spark plug, said electric ignition pulse being generated at an ignition point in time;

providing a time delay starting at said ignition point of time;

applying an electric testing pulse P to the fuel-air mixture through said spark plug during combustion following said ignition pulse and after said time delay, said pulse continuing for a pulse duration;

detecting an electrical effect of the air fuel ratio on said testing pulse as an electrical variable without use of an oxygen sensor to detect and evaluate an entire combustion range.

2. A process in accordance with claim 1, wherein:

said combustion chamber repetitively holds a plurality of air-fuel mixtures, and said steps of applying an electrical pulse and detecting said electrical variable is repetitively performed.

3. A process in accordance with claim 2, further comprising:

evaluating said electrical variable for controlling said air-fuel ratio of one of a subsequent air-fuel mixture and a plurality of subsequent air-fuel mixtures.

4. A process in accordance with claim 2, further comprising:

evaluating said electrical variable for controlling an ignition point of said ignition pulse in one of a subsequent air-fuel mixture and a plurality of subsequent air-fuel mixtures.

5. A process in accordance with claim 1, wherein:

said testing pulse is applied for a duration of the combustion.

6. A process in accordance with claim 1, wherein:

an amplitude of said testing pulse is lower than an amplitude of said ignition pulse, said electrical variable decreases corresponding to the air-fuel ratio combustion compared with said testing pulse, said decrease of said electrical variable is compared with said test pulse after a predetermined time ts, an end of said predetermined time being within a duration of said testing pulse.

7. A process in accordance with claim 1, wherein:

an amplitude of said testing pulse is lower than an amplitude of said ignition pulse, and an integral of said electrical variable is determined over said testing pulse.

8. A process in accordance with claim 1, wherein:

an amplitude of said testing pulse is lower than an amplitude of said ignition pulse, and a time when said electrical variable reaches a predetermined threshold is evaluated.

9. A process in accordance with claim 1, further comprising:

starting integration of said electronic variable when a predetermined threshold is reached.

10. A device for evaluating a air-fuel ratio of a air-fuel mixture during combustion, the device comprising:

a combustion chamber for holding the air-fuel mixture, said combustion chamber including a spark plug;

ignition means for igniting the air-fuel mixture with an electric ignition pulse to said spark plug;

testing pulse generator means for detecting a time of ignition and generating an electric testing pulse to the air-fuel mixture through said spark plug at a time delay after said ignition and for a pulse duration;

evaluating circuit means for evaluating an electrical effect of the air-fuel ratio on said testing pulse without use of an oxygen sensor to detect and evaluate an entire combustion range.

11. A device in accordance with claim 10, wherein:

said ignition means is an ignition coil with a contact breaker triggering said ignition pulse;

said testing pulse generator means detects time of ignition from said contact breaker.

12. A device in accordance with claim 10, wherein:

said testing pulse generator means is connected to said spark plug and to said evaluating circuit means via a precision resistor R1.

13. A device in accordance with claim 10, wherein:

a voltage-dependent resistor is connected in series with a secondary winding of said ignition coil and said voltage dependent resistor uncouples said testing pulse from said secondary winding.

14. A device in accordance with claim 10, further comprising:

a throttle valve for setting combustion chamber air intake;

a fuel input device for setting combustion chamber fuel intake; and control line means connecting said throttle valve and said fuel input device to said evaluating circuit means for detecting an operating state of said throttle valve and said fuel input device and controlling a position of said throttle valve and said fuel input device based on an evaluation by said evaluating device, said evaluation including said evaluating of an electrical effect of the air-fuel ratio on said testing pulse and a determination of operation in the superstoichiometric or substoichiometric range by detecting the actual operating state or the actual direction of adjustment of said throttle valve and said fuel input device.

15. A process for evaluating a air-fuel ratio of a air-fuel mixture during combustion, the process comprising the steps of:

providing a combustion chamber for holding the air-fuel mixture, said combustion chamber including a spark plug;

providing a throttle valve for setting combustion chamber air intake;

providing a fuel input device for setting combustion chamber fuel intake;

igniting the air-fuel mixture with an electric ignition pulse to said spark plug, said electric ignition pulse being generated at an ignition point in time, said pulse continuing for a pulse duration;

providing a time delay starting at said ignition point of time;

applying an electric testing pulse P to the fuel-air mixture through said spark plug during combustion following said ignition pulse and after said time delay;

providing an evaluating circuit;

using said evaluating circuit for detecting an electrical effect of the air fuel ratio on said testing pulse as an electrical variable without use of an oxygen sensor to detect and evaluate an entire combustion range;

providing control lines connecting said throttle valve and said fuel input device to said evaluating circuit for detecting an operating state of said throttle valve and said fuel input device and controlling a position of said throttle valve and said fuel input device based on an evaluation by said evaluating device, said evaluation including evaluating said electrical effect of the air-fuel ratio on said testing pulse and a determination of operation in the superstoichiometric or substoichiometric range by detecting the actual operating state or the actual direction of adjustment of said throttle valve and said fuel input device.

16. A process in accordance with claim 15, wherein:

said combustion chamber repetitively holds a plurality of air-fuel mixtures, and said steps of applying an electrical pulse and detecting said electrical variable is repetitively performed.

17. A process in accordance with claim 16, further comprising:

evaluating said electrical variable for controlling said air-fuel ratio of one of a subsequent air-fuel mixture and a plurality of subsequent air-fuel mixtures.

18. A process in accordance with claim 16, further comprising:

evaluating said electrical variable for controlling an ignition point of said ignition pulse in one of a subsequent air-fuel mixture and a plurality of subsequent air-fuel mixtures.

19. A process in accordance with claim 15, wherein:

an amplitude of said testing pulse is lower than an amplitude of said ignition pulse, said electrical variable decreases corresponding to the air-fuel ratio combustion compared with said testing pulse, said decrease of said electrical variable is compared with said test pulse after a predetermined time ts, an end of said predetermined time being within a duration of said testing pulse.

20. A process in accordance with claim 15, wherein:

an amplitude of said testing pulse is lower than an amplitude of said ignition pulse, and an integral of said electrical variable is determined over said testing pulse.

21. A process in accordance with claim 15, wherein:

an amplitude of said testing pulse is lower than an amplitude of said ignition pulse, and a time when said electrical variable reaches a predetermined threshold is evaluated.

22. A process in accordance with claim 15, further comprising:

starting integration of said electronic variable when a predetermined threshold is reached.

* * * * *